US010077535B2

(12) United States Patent
McCue et al.

(10) Patent No.: US 10,077,535 B2
(45) Date of Patent: Sep. 18, 2018

(54) SIGN POST ASSEMBLY WITH IMPACT ABSORBING MECHANISM

(71) Applicant: McCue Corporation, Peabody, MA (US)

(72) Inventors: David S. McCue, Manchester, MA (US); Teodoro A. Mesa, Lynn, MA (US); Thomas Ustach, Revere, MA (US)

(73) Assignee: McCue Corporation, Peabody, MA (US)

( * ) Notice: Subject to any disclaimer, the term of this patent is extended or adjusted under 35 U.S.C. 154(b) by 19 days.

(21) Appl. No.: 15/137,070

(22) Filed: Apr. 25, 2016

(65) Prior Publication Data

US 2016/0312417 A1 Oct. 27, 2016

Related U.S. Application Data

(60) Provisional application No. 62/152,412, filed on Apr. 24, 2015.

(51) Int. Cl.

| | |
|---|---|
| ***F16M 13/00*** | (2006.01) |
| ***E01F 9/681*** | (2016.01) |
| ***E01F 9/627*** | (2016.01) |
| *G09F 7/18* | (2006.01) |

(52) U.S. Cl.

CPC .............. *E01F 9/681* (2016.02); *E01F 9/629* (2016.02); *G09F 7/18* (2013.01); *G09F 2007/1804* (2013.01)

(58) Field of Classification Search

CPC .. E01F 9/629; E01F 9/681; G09F 2007/1804; G09F 7/18

USPC ...... 248/900, 615, 548; 267/150, 153; 404/6

See application file for complete search history.

(56) References Cited

U.S. PATENT DOCUMENTS 3,091,997 A * 6/1963 Byrd ........................ E01F 9/681 116/63 P
3,131,903 A * 5/1964 Quick ...................... F16F 7/127 248/548
4,923,164 A * 5/1990 Stenberg ............. E04H 12/2215 248/156

FOREIGN PATENT DOCUMENTS

| | | |
|---|---|---|
| CN | 2444983 | 8/2001 |
| EP | 2267225 | 12/2010 |
| FR | 789873 | 11/1935 |
| KR | 20110003169 | 3/2011 |
| WO | 2015/051984 | 4/2015 |

* cited by examiner

*Primary Examiner* — Kimberly T Wood

(74) *Attorney, Agent, or Firm* — Occhiuti & Rohlicek LLP

(57) ABSTRACT

A sign post assembly includes a core assembly. The core assembly includes an impact absorbing mechanism and an elongated post. The impact absorbing mechanism includes an anchoring plate including a through hole, and a first elastic impact absorber. The elongated post has a proximal end and a distal end. A flange is disposed at the distal end of the post and rests on a top surface of the first elastic impact absorber with the post extending through the through hole in anchoring plate. A dimension of an outer surface of the post is less than a dimension of an inner surface of the through hole and the flange has a peripheral shape that prevents the flange from passing through the through hole.

13 Claims, 7 Drawing Sheets

SIGN POST ASSEMBLY WITH IMPACT ABSORBING MECHANISM

CROSS-REFERENCE TO RELATED APPLICATIONS

This application claims the benefit of U.S. Provisional Application No. 62/152,412 filed Apr. 24, 2015, which is incorporated by reference.

BACKGROUND

This invention relates to a sign post assembly having an impact absorbing mechanism.

Sign post assemblies often include a post and a sign with a first end of the post being rigidly anchored to the ground using concrete, bolts, screws, adhesives, core drilling, potting, or other types of anchoring mechanisms or techniques. The sign is then attached to a second end of the post (e.g., using bolts) to complete the assembly. When such conventional sign post assemblies are struck by a large object such as a vehicle, the sign post assembly and/or the vehicle is likely to become damaged. Furthermore, the surface to which the sign post assembly is anchored (e.g., an asphalt parking lot) may be damaged if the force of impact causes the sign post to become dislodged from the ground.

To address this problem, some sign assembles include impact absorption features such as plastic bumpers and impact absorption mechanisms. In general, an impact absorption mechanism causes a sign post assembly to flex to absorb at least some of the force when the sign post assembly is struck by an object. Once the force of the object striking the sign post assembly is removed, the impact absorption mechanism causes the sign post assembly to return to its original state.

SUMMARY

In some examples, when a customer is choosing a sign post assembly for installation on an asphalt surface, the customer needs to ensure that the sign post assembly provides the maximum safety to people and vehicles on the asphalt surface when it is struck and that the sign post assembly does not damage the asphalt surface when it is struck. For example, a sign post assembly should not be so flexible that it easily yields to the force of being struck by an object (e.g., vehicle) and is pushed into a vehicle or a person. The sign post assembly should also not be so rigid that it tears out of and damages the asphalt surface when it is struck by an object. Furthermore, the sign post assembly should be resistant to being damaged or destroyed when it is struck by an object.

Conventional sign assemblies are generally either entirely inflexible (e.g., a steel post stuck in the ground) or are very flexible (e.g., a post with a spring-like impact absorption mechanism). As such, the customer must choose to either risk damaging their asphalt surface when a very rigid sign post assembly is struck or to risk injury and property damage to people in the vicinity of the sign post assembly when a very flexible sign post assembly is struck. There is a need for a sign post assembly which can safely absorb the force of being struck by an object without tearing out of an asphalt surface.

In a general aspect, a sign post assembly includes a core assembly. The core assembly includes an impact absorbing mechanism and an elongated post. The impact absorbing mechanism includes a first anchoring plate including a through hole, and a first elastic impact absorber. The elongated post has a proximal end and a distal end. A flange is disposed at the distal end of the post and rests on a top surface of the first elastic impact absorber with the post extending through the through hole in the first anchoring plate. A dimension of an outer surface of the post is less than a dimension of an inner surface of the through hole and the flange has a peripheral shape that prevents the flange from passing through the through hole.

Aspects may include one or more of the following features.

The first anchoring plate may include a top wall including the through hole, the top wall having a first end and a second end opposite the first end, a first sidewall extending from the first end of the top wall in a first direction substantially perpendicular to the top wall, the first sidewall having a third end attached to the top wall and a fourth end opposite the third end, a second sidewall extending from the second end of the top wall in the first direction, the second sidewall having a fifth end attached to the top wall and a sixth end opposite the fifth end, a first anchoring flange extending from the fourth end of the first sidewall in a second direction substantially perpendicular to the first sidewall and away from the top wall, and a second anchoring flange extending from the sixth end of the second sidewall in a direction substantially perpendicular to the second sidewall and away from the top wall. The first elastic impact absorber may be disposed in a region defined by the top wall, the first sidewall, and the second sidewall.

The sign post assembly may include an outer shell disposed on the core assembly such that at least a portion of the core assembly is covered by the outer shell. The outer shell may include a sign portion for supporting a sign, a hollow base portion for receiving the impact absorbing mechanism of the core assembly, and a hollow post portion for receiving the elongated post of the core assembly, the post portion extending between the sign portion and the base portion. The outer shell may include a number of recessed through holes, the elongated post may include a number of through holes, and the outer shell may be coupled to the elongated post using fasteners inserted into corresponding through holes in the outer shell and the elongated post.

The impact absorbing mechanism may include a first anchoring fastener extending through a first anchoring through hole in the first anchoring flange and a second anchoring fastener extending through a second anchoring through hole in the second anchoring flange. The first anchoring fastener may include a first threaded rod and a first impact absorption assembly. The first impact absorption assembly may include a second elastic impact absorber resting on the first anchoring flange with the first threaded rod extending therethrough, a first washer resting on the second elastic impact absorber with the first threaded rod extending therethrough; and a first threaded nut resting on the first washer with the first threaded rod extending therethrough.

The second anchoring fastener may include a second threaded rod and a second impact absorption assembly. The second impact absorbing assembly may include a third elastic impact absorber resting on the second anchoring flange with the second threaded rod extending therethrough, a second washer resting on the third elastic impact absorber with the second threaded rod extending therethrough, and a second threaded nut resting on the second washer with the second threaded rod extending therethrough.

The first elastic impact absorber may be spaced from the first sidewall and the second sidewall. The post may have a substantially circular cross-sectional shape, the through hole may have a substantially circular shape, and the peripheral shape of the flange may be substantially rectangular. A compressive force may be applied to the first elastic impact absorber via the top wall of the first anchoring plate. A length of the first sidewall and a length of the second sidewall may be less than a thickness of the first elastic impact absorber.

The assembly may include a second elastic impact absorber including a through hole, the second elastic impact absorber disposed on the flange at the distal end of the elongated post, with the elongated post extending through the through hole of the second elastic impact absorber.

The hollow post portion may include a first hollow post portion and a second hollow post portion, wherein the first hollow post portion is configured to fit within the second hollow post portion such that the first hollow post portion is configured to slide into and out of the second hollow post portion. The first hollow post portion may include one or more first through holes and the second hollow post portion includes one or more second through holes, the first and second through holes configured to receive a fastener to hold the first hollow post portion and the second hollow post portion in a fixed position. The assembly may include a second anchoring plate disposed under the first anchoring plate with the first elastic impact absorber resting thereon.

Aspects may have one or more of the following advantages.

Among other advantages, aspects advantageously absorb impacts from objects while preventing damage to the sign post assembly, preventing damage to the surface to which the sign post assembly is mounted, preventing injury to people walking in a vicinity of the sign post assembly, and preventing damage to vehicles in the vicinity of the sign post assembly.

Certain aspects include rounded exterior surfaces to prevent accumulation of debris and water on the sign post assembly.

Certain aspects are made of a plastic material which is resistant to scuffing and cracking, resulting in an aesthetically pleasing sign post assembly.

Certain aspects are capable of withstanding the force of a vehicle driving into the sign post assembly at a speed of 3 miles per hour.

Certain aspects can be anchored to a surface (e.g., an asphalt surface) using 1 inch diameter holes with an epoxy disposed therein. This type of anchoring is advantageous due to its simplicity as compared to other anchoring mechanisms such as conventional core drilled and concrete potted anchoring mechanisms.

Certain aspects include a lower anchoring plate to prevent elements of the impact absorption mechanism from damaging the anchoring surface.

Other features and advantages of the invention are apparent from the following description, and from the claims.

FIG. **7*a*** is a perspective view of a sign post with an adjustable height in an extended configuration.

Figure 7A:
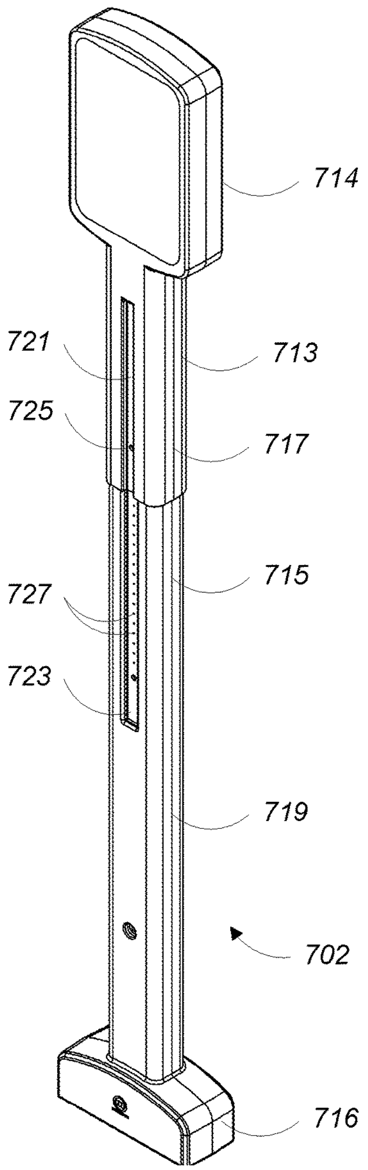

FIG. **7*b* is a perspective view of the sign post of FIG. 7*a*** in a lowered configuration.

Figure 8:
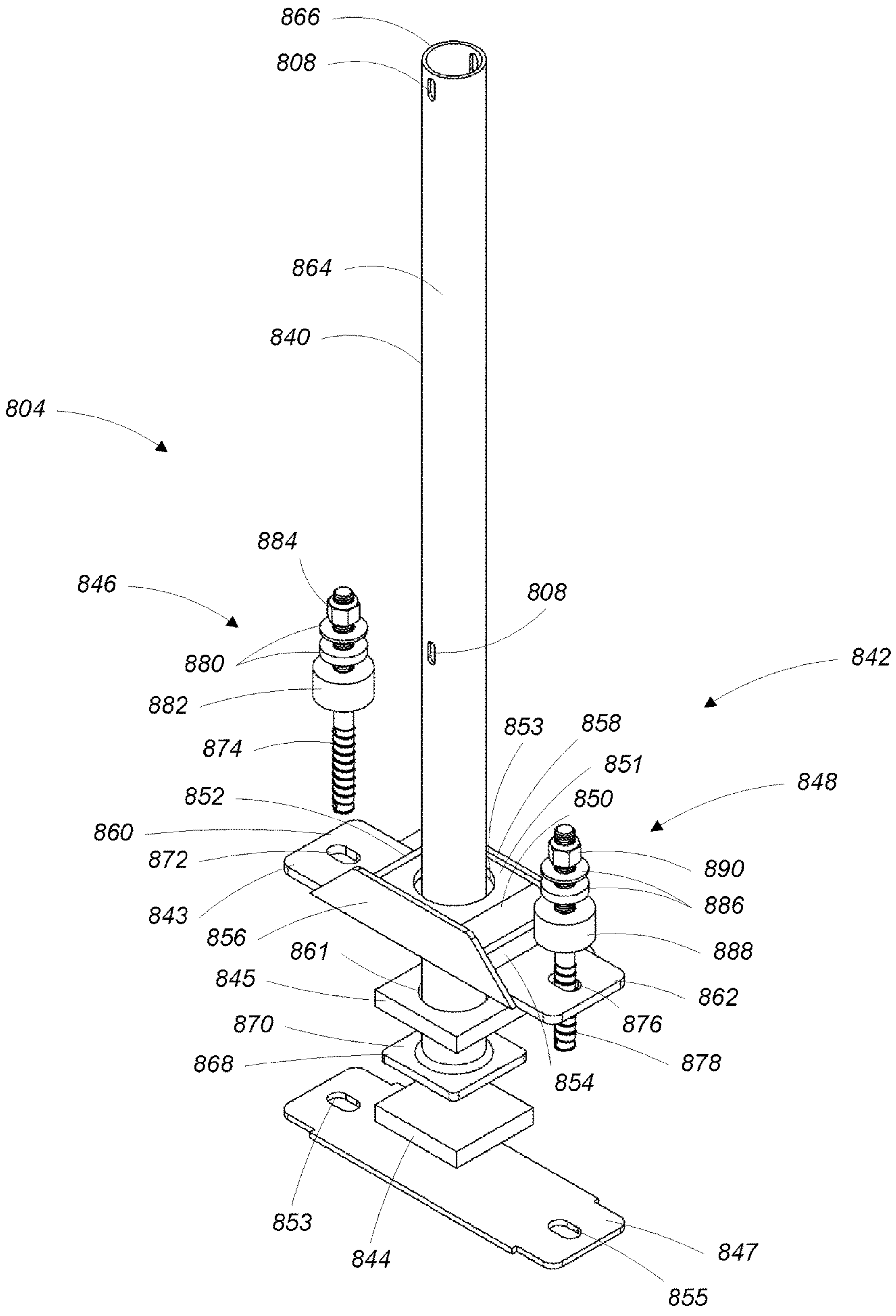

FIG. 8 is an exploded view of another embodiment of an inner core.

DESCRIPTION

1 Sign Post Assembly

Figure 1:
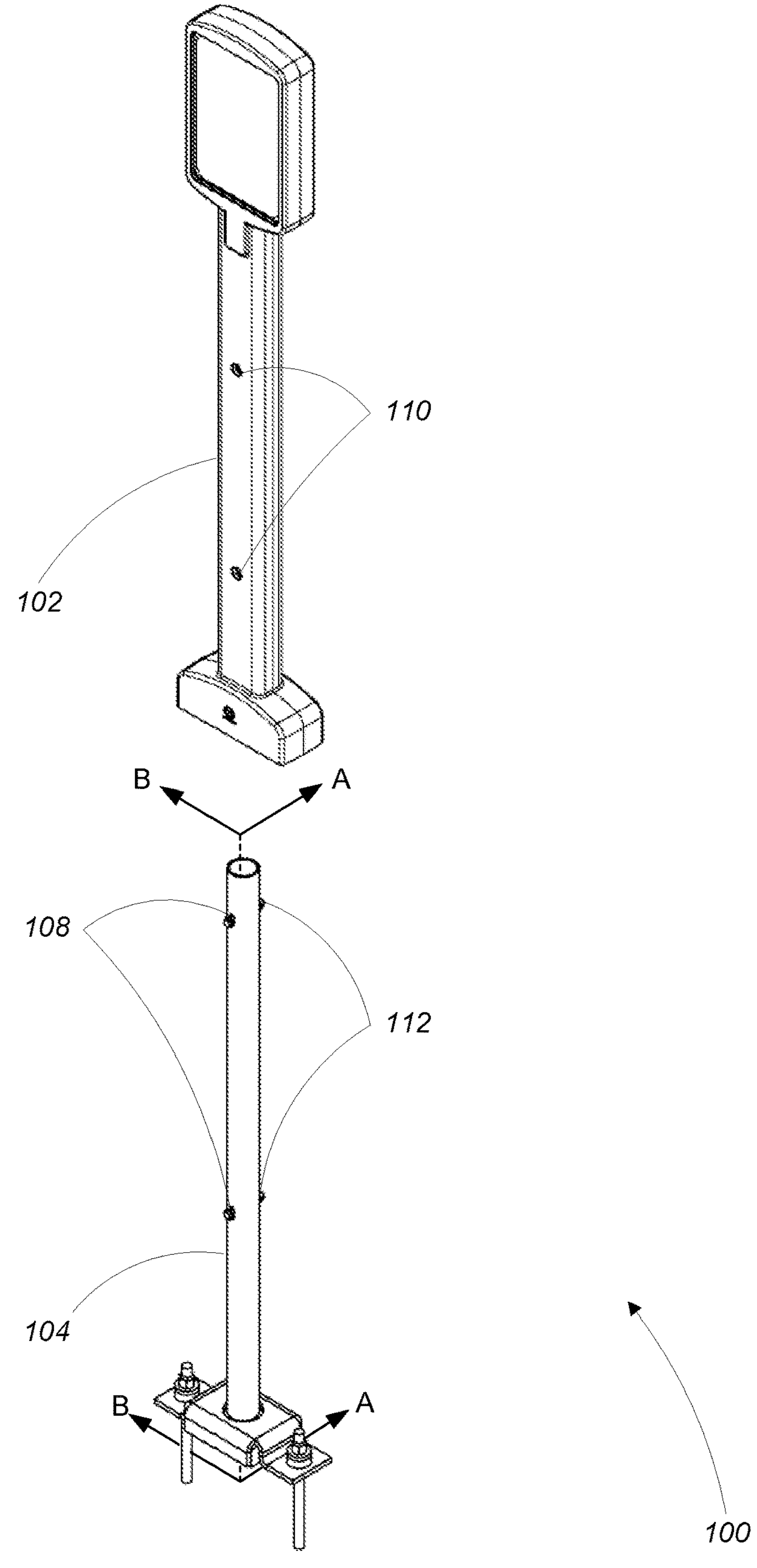
FIG. 1 is a partially exploded perspective view of the sign post.

Referring to FIG. 1, a sign post assembly 100 includes a hollow outer shell 102 and an impact absorbing inner core 104. When the sign post assembly 100 is installed, the impact absorbing inner core 104 is anchored to a surface (e.g., an asphalt surface, see FIG. 4) and the impact absorbing inner core 104 is inserted into the outer shell 102 through an opening (not shown) in a bottom end 106 of the outer shell 102. The outer shell 102 is then affixed to the inner core 104 using fasteners 108 (e.g., bolts) inserted through holes 110 in a portion of the outer shell 102 and through holes 112 in a portion of the inner core 104.

1.1 Outer Shell

Figure 2:
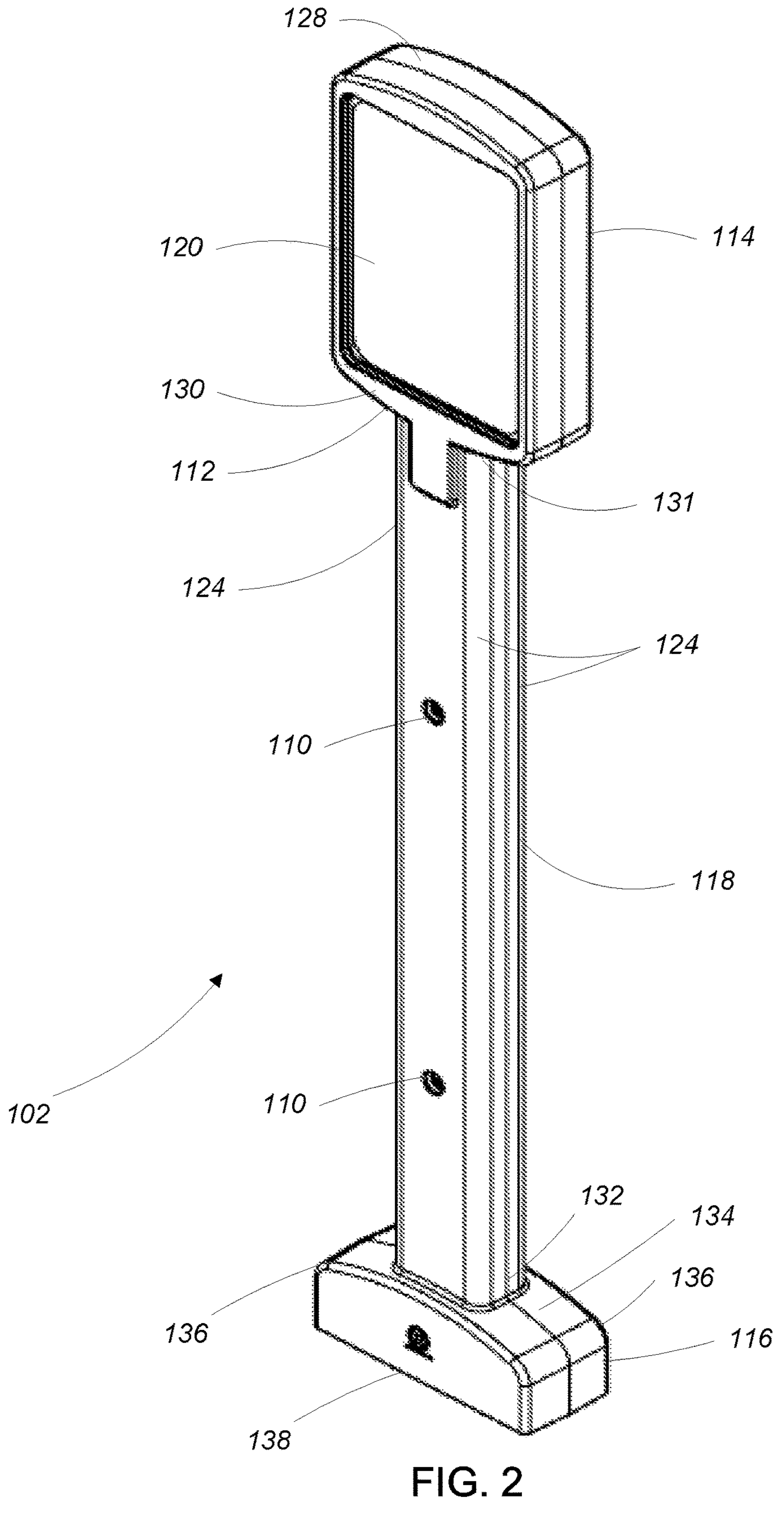
FIG. 2 is a perspective view of the outer shell of FIG. 1.

Referring to FIG. 2, the outer shell 102 includes a sign portion 114, a base portion 116, and a post portion 118 extending between the sign portion 114 and the base portion 116. The sign portion 114 has a substantially rectangular shape and includes a substantially rectangular sign receiving portion 120 which is configured to securely hold a sign (e.g., a "Handicapped Parking" sign or a "No Parking" sign). In some examples, the sign is secured to the sign receiving portion 120 using fasteners such as blind rivets, screws, and/or adhesives. In some examples, the sign receiving portion 120 is recessed from a front surface 130 of the sign portion 114. In some examples, a top surface 128 and/or a bottom surface 112 of the sign portion 114 has a convex, rounded shape. In some examples, a back side (not shown) of the outer shell is a mirror image of the front side as shown in FIG. 1. In other examples, the back side of the outer shell does not have a corresponding sign receiving portion.

The post portion 118 is an elongated, hollow member having a top end 131 and a bottom end 132. The top end 131 of the post portion 118 is attached to the bottom surface 112 of the sign portion 114, with the post portion 118 extending away from the bottom surface 112 of the sign portion 114 in direction substantially perpendicular to the bottom surface 112. The bottom end 132 of the post portion 118 is attached to a top surface 134 of the base portion 116 with the post portion 118 extending away from the top surface 134 of the base portion 116 in direction substantially perpendicular to the top surface 134 of the base portion 116.

In some examples, the post portion 118 has a substantially rectangular cross-sectional shape and rounded edges 124. In some examples, the post portion 118 includes one or more (e.g., two) through holes 110 through which the outer shell 102 is affixed to the inner core 104. In some examples, each of the one or more through holes 110 is recessed to prevent hardware such as fasteners from protruding from the holes 110 and snagging on passing objects. In some examples, the post 340 has length in a range of 16 inches to 86 inches, where 16 inches is a lowest impact point from a standard car bumper and 87 inches has the post 340 extending through the entire outer shell 102.

The base portion 116 is a hollow member with a substantially cuboid shape. In some examples, the top surface 134 of the base portion 116 is rounded or convex. In some examples, some or all of the edges 136 of the base portion 116 are rounded. In some examples, a bottom end 138 of the base portion 116 is open such that the inner core 104 can be inserted into the outer shell 102 through the bottom end 138. In some examples, the base portion 116 is shaped and sized to accommodate an impact absorbing mechanism (described in greater detail below) of the inner core 104.

In some examples, the outer shell 102 is made of a plastic material such as high density polyethylene (HDPE). In some examples, a thickness of the walls of the outer shell is in a range of 0.125 inches to 0.5 inches.

In some examples, the outer shell 102 is eighty inches tall. In some examples, a distance from a surface on which the outer shell rests 102 to the bottom surface 112 of the sign portion 114 is approximately 60 inches. In some examples, a width of the sign portion 114 exceeds a width of the post portion 118 by 8 inches or less.

1.2 Inner Core

Figure 3:
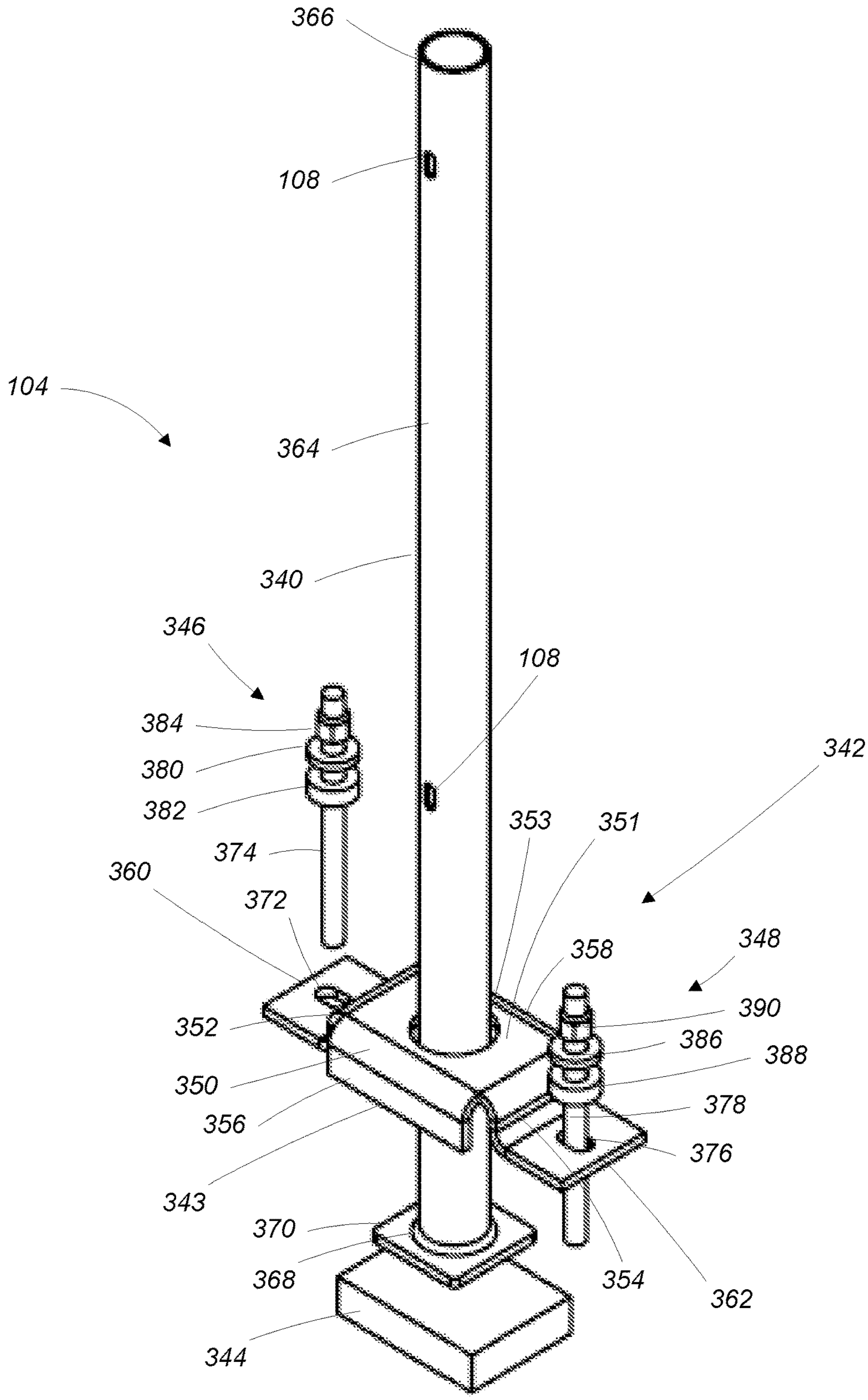
FIG. 3 is an exploded perspective view of the inner core of FIG. 1.

Referring to FIG. 3, one example of the inner core 104 includes a post 340 and an impact absorption mechanism 342. In some examples, the post 340 includes a hollow metallic tube 364 having a proximal end 366 and a distal end 368. A stop flange 370 is disposed at the distal end 368 of the metallic tube 364. In some examples, the stop flange 370 has a square shape. In some examples, the metallic tube 364 of the post 340 includes one or more through holes 108. In some examples, the post 340 has a length in a range of 35 to 65 inches. In some examples the post 340 is 40 inches long.

The impact absorption mechanism 342 includes an anchoring plate 343, a first impact absorbing anchoring assembly 346, a second impact absorbing anchoring assembly 348, and a rectangular impact absorber 344.

In some examples, the anchoring plate 343 includes a central housing 350 having a top wall 351, a first side wall 352 extending from the top wall 351, a second side wall 354 extending from the top wall 351, a third side wall 356 extending from the top wall 351, and a fourth side wall 358 extending from the top wall 351.

The top wall 351 of the housing 350 includes a through hole 353 through which the metallic tube 364 of the post 340 extends. A diameter of the through hole 353 is specified to be greater than an outer diameter of the metallic tube 364 of the post 340 and less than a greatest outer diameter of the stop flange 370 of the post 340. In this way, the stop flange 370 prevents the post 340 from being drawn entirely through the through hole 353 of the housing 350.

A first anchoring flange 360 extends from a free end of the first side wall 352 and includes a first anchoring through hole 372 for receiving a first anchoring fastener 374 of the first impact absorbing anchoring assembly 346. A second anchoring flange 362 extends from a free end of the second side wall 354 and includes a second anchoring through hole 376 for receiving a second anchoring fastener 378 of the second impact absorbing anchoring assembly 348.

The first impact absorbing anchoring assembly 346 includes the first anchoring fastener 374, a first washer 380, and a first substantially cylindrical impact absorber 382. In some examples, both the first washer 380 and the first substantially cylindrical impact absorber 382 include a central through hole for receiving a portion of the first anchoring fastener 374. In some examples, the first anchoring fastener 374 is a threaded rod and the first impact absorbing anchoring assembly 346 includes a first threaded nut 384 that screws on to the first anchoring fastener 374. In some examples, the first cylindrical impact absorber 382 is made of an elastic material such as neoprene or ethylene propylene diene monomer (EPDM).

The second impact absorbing anchoring assembly 348 includes the second anchoring fastener 378, a second washer 386, and a second substantially cylindrical impact absorber 388. In some examples, both the second washer 386 and the second substantially cylindrical impact absorber 388 include a central through hole for receiving a portion of the second anchoring fastener 378. In some examples, the second anchoring fastener 378 is a threaded rod and the second impact absorbing anchoring assembly 348 includes a second threaded nut 390 that screws on to the second anchoring fastener 378. In some examples, the second cylindrical impact absorber 388 is made of an elastic material such as neoprene or ethylene propylene diene monomer (EPDM).

The rectangular impact absorber 344 is shaped and sized to fit within the housing 350 with the stop flange 370 of the post 340 resting thereon. In some examples, the rectangular impact absorber 344 is made of an elastic material such as neoprene or ethylene propylene diene monomer (EPDM).

Figure 4:
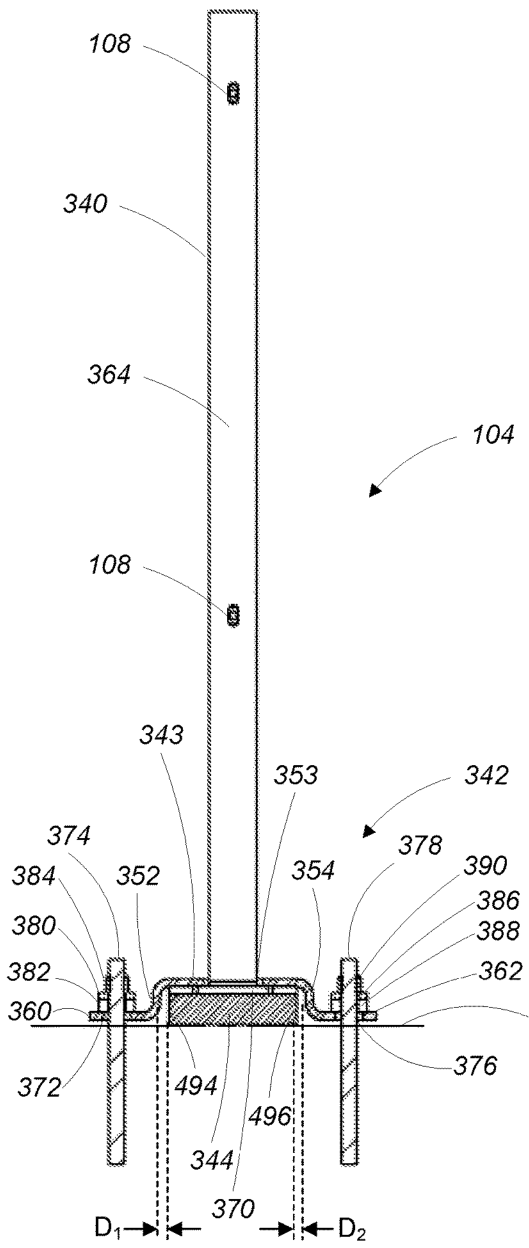
FIG. 4 is a front cross-sectional view along line B-B of the inner core of FIG. 1.

Referring to FIG. 4, when the inner core 104 is assembled, the first anchoring fastener 374 and the second anchoring fastener 378 are fixed into a surface 492 (e.g., using an epoxy resin fixing technique). The post 340 is inserted through the through hole 353 of the anchoring plate 343 and the rectangular impact absorber 344 is placed in the housing 350. With the post 340 and rectangular impact absorber 344 in place, the anchoring plate 343 is placed over the first anchoring fastener 374 and the second anchoring fastener 378 such that the first anchoring fastener 374 extends through the first anchoring through hole 372 in the first anchoring flange 360 and the second anchoring fastener 378 extends through the second anchoring through hole 376 in the second anchoring flange 362.

The first impact absorbing anchoring assembly 346 is then assembled by placing the first cylindrical impact absorber 382 and the first washer 380 on the first anchoring fastener 374. The first threaded nut 384 is then screwed onto the first anchoring fastener 374 until the first impact absorbing anchoring assembly 346 is securely assembled.

Similarly, the second impact absorbing anchoring assembly 348 is assembled by placing the second cylindrical impact absorber 388 and the second washer 386 on the second anchoring fastener 378. The second threaded nut 390 is then screwed onto the second anchoring fastener 378 until the second impact absorbing anchoring assembly 348 is securely assembled.

In some examples, the combined height of the stop flange 370 of the post 340 and the rectangular impact absorber 344 is greater than a height of an interior of the housing 350. When the first and second impact absorbing anchoring assemblies 346, 348 are assembled, this difference in height causes the housing 350 to apply a compressive force to the rectangular impact absorber 344, ensuring that the post 340 is securely held in place.

In some examples, after installation, a distance, $D_1$ exists between an inner surface of the first side wall 352 and a first side surface 494 of the rectangular impact absorber 344. Similarly, the distance, $D_2$ exists between an inner surface of the second side wall 354 and a second side surface 496 of the rectangular impact absorber 344. In some examples, $D_1$ and $D_2$ are equal to one another. In some examples, the distances D1 and D2 allow space for the rectangular impact absorber 344 to deform when the post 340 deflects, causing the stop flange 370 to transfer force into the rectangular impact absorber 344.

Figure 5:
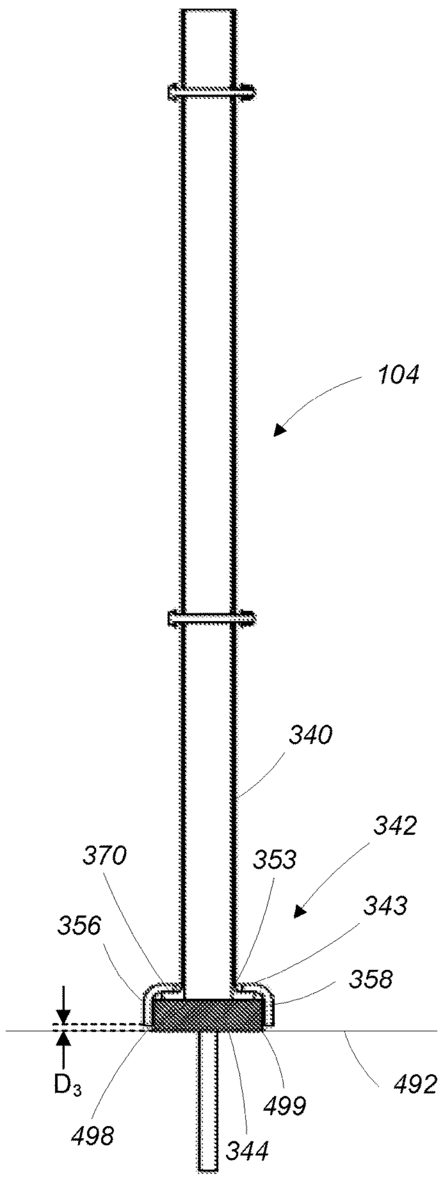
FIG. 5 is a side cross-sectional view along line A-A of the inner core of FIG. 1.

Referring to FIG. 5, in some examples, after installation, an inner surface of the third side wall 356 abuts a third side 498 of the rectangular impact absorber 344 and an inner surface of the fourth side wall 358 abuts a fourth side 499 of the rectangular impact absorber 344.

In some examples, the third side wall 356 and the fourth side wall 358 are elevated above the surface 492 by a distance, $D_3$. In some examples, this elevation allows the anchoring plate 343 to deflect to a certain degree without making contact with the surface 492 when the sign post assembly 100 is struck by an object. In some examples, the first side wall 352 and the second side wall 354 are also elevated from the surface 492 by a distance approximately equal to $D_3$.

Figure 6:
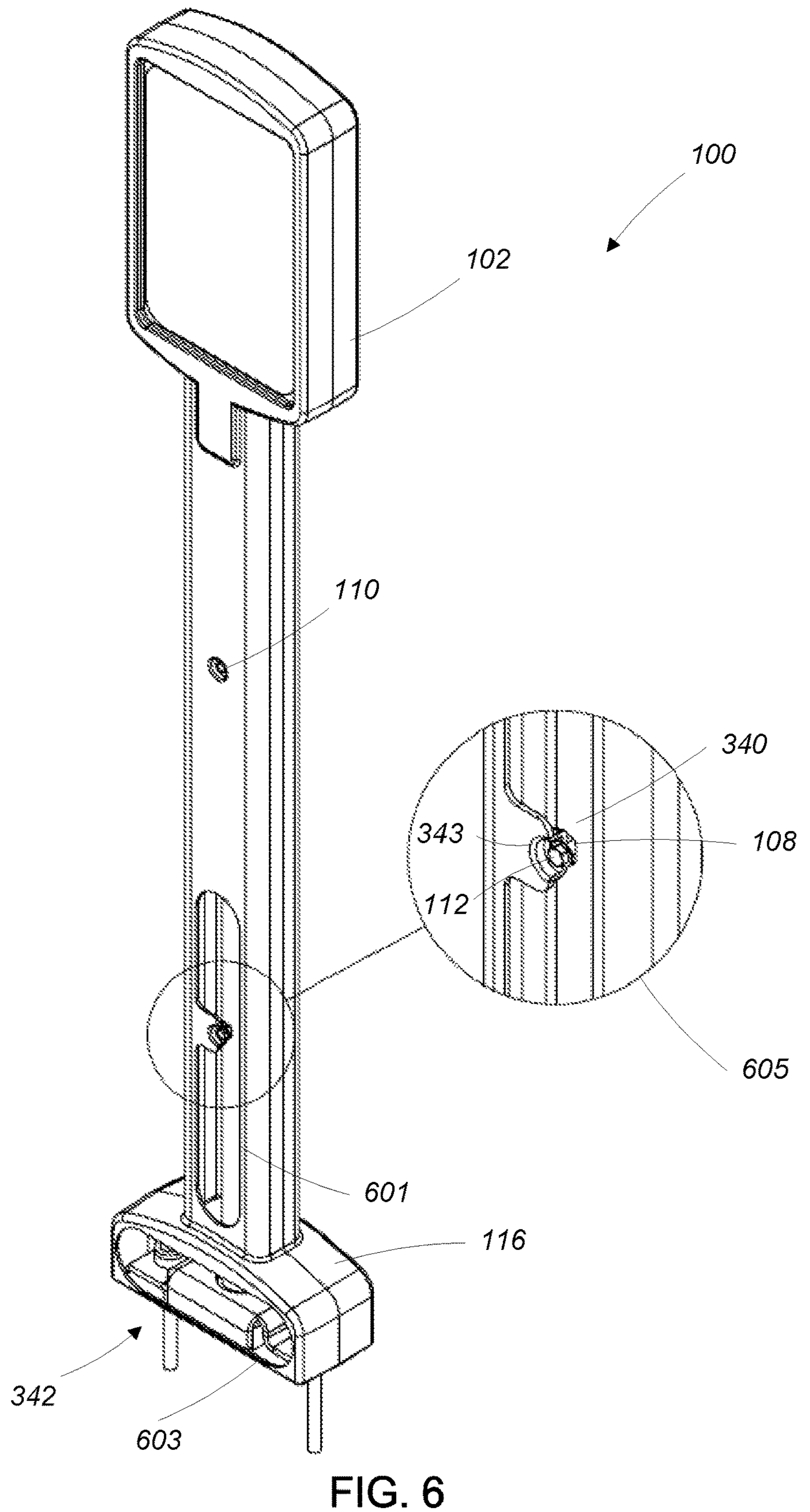
FIG. 6 is a perspective view of the sign post of FIG. 1 in an assembled state.

Referring to FIG. 6, the sign post assembly 100 is shown in its fully assembled state, with the outer shell 102 placed on and secured to the inner core 104. FIG. 6 includes a first cut-away 601 and a second cut-away 603 which show portions of the inner core 104 inside of the outer shell 102. A detailed view 605 of a part of the first cut-away 601 shows how a connection is established through one of the recessed through holes 110 in the outer shell 102 and through the post 340 of the inner core 104. For example, a fastener 112 (e.g., a bolt) extends through the through hole 110 in the front side of the outer shell 102, through the through hole 108 in the front side of the post 340, through a through hole (not shown) in the rear side of the post 340, and through a through hole (not shown) in the rear side of the outer shell 102.

The second cut-away 603 shows how the base portion 116 of the outer shell 102 covers the impact absorption mechanism 342 of the inner core 104, preventing it from being tampered with, becoming damaged, or accumulating debris.

2 Sign Post Assembly Operation

In some examples, the sign post assembly 100 is installed in an environment such as a parking lot of a retail store. Such parking lots have significant vehicle and human traffic. The sign post assembly 100 is configured to withstand being struck by objects such as vehicles without being damaged, without causing collateral damage to other vehicles, without harming any people in the vicinity of the sign post assembly, and without causing damage to the parking lot surface.

The outer shell 102 of the sign post assembly 100 serves as an aesthetically pleasing cover and as a first impact absorbing feature of the sign post assembly 100. The outer shell 102 is capable of being struck by objects such as vehicles and shopping carts without becoming damaged (e.g., dented or scuffed).

Furthermore, when an object strikes the sign post assembly 100, the inner core 104 of the sign post assembly 100, including the impact absorption mechanism 342 is engaged. For example, when the object strikes the sign post assembly 100, the force of impact causes the post 340 deflect (i.e., tilt). As the post 340 deflects, the stop flange 370 of the post 340 deflects, transferring at least some of the force of the impact into the rectangular impact absorber 344. Since the through hole 353 in the top wall 351 of the anchoring plate 343 has a diameter larger than the diameter of the post 340, the post 340 is able to deflect to certain degree (e.g., 20 degrees) before the metallic post 364 of the post 340 makes contact with an inner surface of the through hole 353. At some point, given a sufficiently strong force of impact, the metallic tube 364 of the post 340 makes contact with the inner surface of the through hole 353 and the stop flange 370 makes contact with a bottom surface of the top wall 351. At that point, the anchoring plate 343 begins to deflect along with the post 340. With the anchoring plate 343 deflecting, the force of the impact is also transferred into the first and second impact absorbing assemblies 346, 348. Eventually, after the force of impact from the object is fully absorbed, the object moves away from the sign post assembly 100 and the sign post assembly 100 returns to its original configuration due to the resiliency of the outer shell 102 and the impact absorption mechanism 342.

In some examples, the sign post assembly 100 is designed to deflect up to 15 to 20 degrees without becoming damaged.

3 Alternatives

Referring to FIG. 7*a*, another embodiment of the outer shell 702 has an adjustable height and is shown in an extended configuration. The outer shell 702 includes an upper shell portion 713 and a lower shell portion 715. The upper shell portion 713 includes a sign portion 714 and a first post portion 717. The lower shell portion 715 includes a second post portion 719 and a base portion 716.

The second post portion 719 of the lower shell portion 715 is configured to fit within the first post portion 717 of the upper shell portion 713 such that the second post portion 719 can be slid into and out of the upper shell portion 713 in a telescoping manner. In this way, a height of the outer shell 702 can be adjusted to suit various applications.

In some examples, the first post portion 717 includes a key 721 that is configured to fit within a corresponding groove 723 in the second post portion 719. In some examples, the interaction of the key 721 and the groove 723 ensures proper alignment of the upper shell portion 713 and the lower shell portion 715. The key 721 includes a first through hole 725. The groove 723 includes a plurality of second through holes 727. To fix the outer shell 702 at a desired height, the first shell portion 713 of the outer shell 702 and the second shell portion 715 of the outer shell 702 are slid relative to one another until the desired height is achieved. A fastener (e.g., a bolt) is then inserted through the first through hole 725 and through one of the second through holes 727 corresponding to the desired height, thereby restricting the telescoping movement of the first shell portion 713 relative to the second shell portion 715.

Figure 7B:
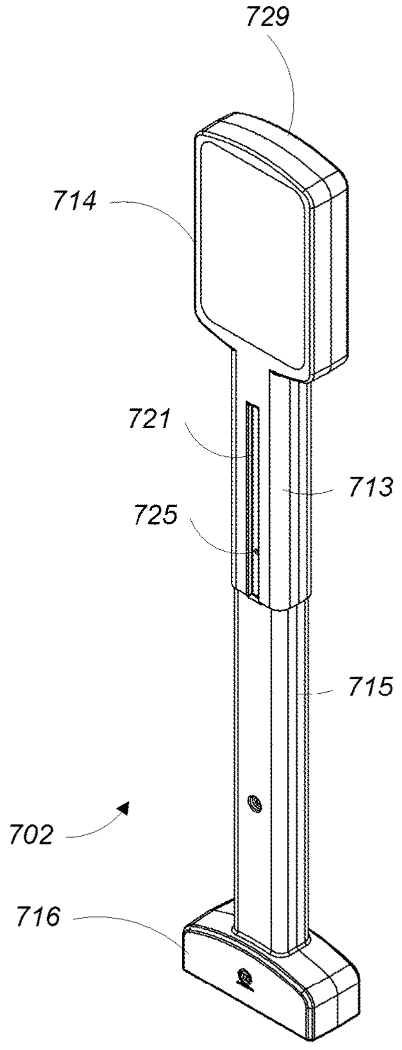

Referring to FIG. 7*b*, the outer shell 702 of FIG. 7*a* is shown in a lowered configuration. In the lowered configuration, a distal end (not shown) of the second post portion 719 abuts or lies adjacent to an inner wall of a proximal end 729 of the upper shell portion 713.

With the exception of the telescoping features of the outer shell 702, the outer shell 702 inherits some or all of the features of the outer shell 102 shown in FIG. 2.

Referring to FIG. 8, another embodiment of the inner core 804 includes a post 840 and an impact absorption mechanism 842. In some examples, the post 840 includes a hollow metallic tube 864 having a proximal end 866 and a distal end 868. A stop flange 870 is disposed at the distal end 868 of the metallic tube 864. In some examples, the stop flange 870 has a square shape. In some examples, the metallic tube 864 of the post 840 includes one or more through holes 808. In some examples, the post 840 has a length in a range of 35 to 65 inches. In some examples the post 840 is 40 inches long.

The impact absorption mechanism 842 includes an upper anchoring plate 843, a lower anchoring plate 847, a first impact absorbing anchoring assembly 846, a second impact absorbing anchoring assembly 848, a lower rectangular impact absorber 844, and an upper rectangular impact absorber 845.

In some examples, the upper anchoring plate 843 includes a central housing 850 having a top wall 851, a first side wall 852 extending from the top wall 851, a second side wall 854 extending from the top wall 851, a third side wall 856 extending from the top wall 851, and a fourth side wall 858 extending from the top wall 851.

The top wall 851 of the housing 850 includes a through hole 853 through which the metallic tube 864 of the post 840 extends. A diameter of the through hole 853 is specified to be greater than an outer diameter of the metallic tube 864 of the post 840 and less than a greatest outer diameter of the stop flange 870 of the post 840. In this way, the stop flange 870 prevents the post 840 from being drawn entirely through the through hole 853 of the housing 850.

A first anchoring flange 860 extends from a free end of the first side wall 852 and includes a first anchoring through hole 872 for receiving a first anchoring fastener 874 of the first impact absorbing anchoring assembly 846. A second anchoring flange 862 extends from a free end of the second side wall 854 and includes a second anchoring through hole 876 for receiving a second anchoring fastener 878 of the second impact absorbing anchoring assembly 848.

The lower anchoring plate 847 is disposed below the upper anchoring plate 843 and includes a third anchoring through hole 853 for receiving the first anchoring fastener 874 and a fourth anchoring through hole 855 for receiving the second anchoring fastener 878.

The first impact absorbing anchoring assembly 846 includes the first anchoring fastener 874, one or more first washers 880, and a first substantially cylindrical impact absorber 882. In some examples, the first washers 880 and the first substantially cylindrical impact absorber 882 include a central through hole for receiving a portion of the first anchoring fastener 874. In some examples, the first anchoring fastener 874 is a threaded rod and the first impact absorbing anchoring assembly 846 includes a first threaded nut 884 that screws on to the first anchoring fastener 874. In some examples, the first cylindrical impact absorber 882 is made of an elastic material such as neoprene or ethylene propylene diene monomer (EPDM).

The second impact absorbing anchoring assembly 848 includes the second anchoring fastener 878, one or more second washers 886, and a second substantially cylindrical impact absorber 888. In some examples, the second washers 886 and the second substantially cylindrical impact absorber 888 include a central through hole for receiving a portion of the second anchoring fastener 878. In some examples, the second anchoring fastener 878 is a threaded rod and the second impact absorbing anchoring assembly 848 includes a second threaded nut 890 that screws on to the second anchoring fastener 878. In some examples, the second cylindrical impact absorber 888 is made of an elastic material such as neoprene or ethylene propylene diene monomer (EPDM).

The lower rectangular impact absorber 844 is shaped and sized to fit within the housing 850, resting on the lower anchoring plate 847 with the stop flange 870 of the post 840 resting thereon. The upper rectangular impact absorber 845 includes a through hole 861 and is shaped and sized to fit within the housing 850, resting on the stop flange 870 with the with the metallic tube 864 of the post 840 extending through the though hole 861. In some examples, the upper rectangular impact absorber 845 and the lower rectangular impact absorber 844 are made of an elastic material such as neoprene or ethylene propylene diene monomer (EPDM).

It is to be understood that the foregoing description is intended to illustrate and not to limit the scope of the invention, which is defined by the scope of the appended claims. Other embodiments are within the scope of the following claims.

What is claimed is:

1. A sign post assembly comprising:

a core assembly including an impact absorbing mechanism including a first anchoring plate including a through hole, and a first elastic impact absorber;

a second elastic impact absorber including a through hole; and an elongated post having a proximal end and a distal end, the post including a flange disposed at the distal end, the flange resting on a top surface of the first elastic impact absorber with the post extending through the through hole in the first anchoring plate, the second elastic impact absorber being disposed on the flange at the distal end of the elongated post, with the elongated post extending through the through hole of the second elastic impact absorber;

wherein a dimension of an outer surface of the post is less than a dimension of an inner surface of the through hole in the first anchoring plate, the flange has a peripheral shape that prevents the flange from passing through the through hole in the first anchoring plate, the diameter of the through hole in the first anchoring plate being less than a greatest outer diameter of the flange, and the first anchoring plate includes:

a top wall including the through hole, the top wall having a first end and a second end opposite the first end;

a first sidewall extending from the first end of the top wall in a first direction substantially perpendicular to the top wall, the first sidewall having a third end attached to the top wall and a fourth end opposite the third end;

a second sidewall extending from the second end of the top wall in the first direction, the second sidewall having a fifth end attached to the top wall and a sixth end opposite the fifth end;

a first anchoring flange extending from the fourth end of the first sidewall in a second direction substantially perpendicular to the first sidewall and away from the top wall; and a second anchoring flange extending from the sixth end of the second sidewall in a direction substantially perpendicular to the second sidewall and away from the top wall;

wherein the first elastic impact absorber is disposed in a region defined by the top wall, the first sidewall, and the second sidewall.

2. A sign post assembly comprising:

a core assembly including an impact absorbing mechanism including a first anchoring plate including a through hole, and a first elastic impact absorber;

a second elastic impact absorber including a through hole; and an elongated post having a proximal end and a distal end, the post including a flange disposed at the distal end, the flange resting on a top surface of the first elastic impact absorber with the post extending through the through hole in the first anchoring plate, the second elastic impact absorber being disposed on the flange at the distal end of the elongated post, with the elongated post extending through the through hole of the second elastic impact absorber; and an outer shell disposed on the core assembly such that at least a portion of the core assembly is covered by the outer shell;

wherein a dimension of an outer surface of the post is less than a dimension of an inner surface of the through hole in the first anchoring plate, the flange has a peripheral shape that prevents the flange from passing through the through hole in the first anchoring plate, the diameter of the through hole in the first anchoring plate being less than a greatest outer diameter of the flange.

3. The assembly of claim 2 wherein the outer shell includes a sign portion for supporting a sign;

a hollow base portion for receiving the impact absorbing mechanism of the core assembly; and a hollow post portion for receiving the elongated post of the core assembly, the post portion extending between the sign portion and the base portion.

4. The assembly of claim 3 wherein the hollow post portion includes a first hollow post portion and a second hollow post portion, wherein the first hollow post portion is configured to fit within the second hollow post portion such that the first hollow post portion is configured to slide into and out of the second hollow post portion.

5. The assembly of claim 4 wherein the first hollow post portion includes one or more first through holes and the second hollow post portion includes one or more second through holes, the first and second through holes configured to receive a fastener to hold the first hollow post portion and the second hollow post portion in a fixed position.

6. The assembly of claim 2 wherein the outer shell includes a plurality of recessed through holes, the elongated post includes a plurality of through holes, and the outer shell is coupled to the elongated post using fasteners inserted into corresponding through holes in the outer shell and the elongated post.

7. The assembly of claim 2 wherein the impact absorbing mechanism further includes:

a first anchoring fastener extending through a first anchoring through hole in the first anchoring flange, and a second anchoring fastener extending through a second anchoring through hole in the second anchoring flange.

8. The assembly of claim 7 wherein the first anchoring fastener includes a first threaded rod and a first impact absorption assembly including a third elastic impact absorber resting on the first anchoring flange with the first threaded rod extending therethrough, a first washer resting on the third elastic impact absorber with the first threaded rod extending therethrough; and a first threaded nut resting on the first washer with the first threaded rod extending therethrough; and the second anchoring fastener includes a second threaded rod and a second impact absorption assembly including a fourth elastic impact absorber resting on the second anchoring flange with the second threaded rod extending therethrough, a second washer resting on the fourth elastic impact absorber with the second threaded rod extending therethrough; and a second threaded nut resting on the second washer with the second threaded rod extending therethrough.

9. The assembly of claim 2 wherein the first elastic impact absorber is spaced from the first sidewall and the second sidewall.

10. The assembly of claim 2 wherein the post has a substantially circular cross-sectional shape, the through hole of the first anchoring plate has a substantially circular shape, and the peripheral shape of the flange is substantially rectangular.

11. The assembly of claim 6 wherein the combined height of the flange and the first and second elastic impact absorbers is greater than a height of an interior of the first anchoring plate and when the first and second anchoring fasteners are assembled, this difference in height causes a compressive force to be applied to the first and second elastic impact absorbers via the top wall of the first anchoring plate.

12. The assembly of claim 2 wherein a length of the first sidewall and a length of the second sidewall is less than a thickness of the first and second elastic impact absorbers.

13. A sign post assembly comprising:

a core assembly including an impact absorbing mechanism including a first anchoring plate including a through hole, a first elastic impact absorber;

a second anchoring plate disposed under the first anchoring plate with the first elastic impact absorber resting thereon, and a second elastic impact absorber including a through hole; and an elongated post having a proximal end and a distal end, the post including a flange disposed at the distal end, the flange resting on a top surface of the first elastic impact absorber with the post extending through the through hole in the first anchoring plate, the second elastic impact absorber being disposed on the flange at the distal end of the elongated post, with the elongated post extending through the through hole of the second elastic impact absorber;

wherein a dimension of an outer surface of the post is less than a dimension of an inner surface of the through hole in the first anchoring plate, and the flange has a peripheral shape that prevents the flange from passing through the through hole in the first anchoring plate, the diameter of the through hole in the first anchoring plate being less than a greatest outer diameter of the flange.

* * * * *